(12) United States Patent
Woodell et al.

(10) Patent No.: US 8,933,836 B1
(45) Date of Patent: Jan. 13, 2015

(54) HIGH SPEED ANGLE-TO-TARGET ESTIMATION FOR A MULTIPLE ANTENNA SYSTEM AND METHOD

(75) Inventors: Daniel L. Woodell, Cedar Rapids, IA (US); Jeffery A. Finley, Cedar Rapids, IA (US); David L. Van Dusseldorp, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 523 days.

(21) Appl. No.: 13/251,063

(22) Filed: Sep. 30, 2011

(51) Int. Cl.
*G01S 13/72* (2006.01)
*G01S 13/44* (2006.01)
*G01S 7/40* (2006.01)

(52) U.S. Cl.
CPC ............... *G01S 13/44* (2013.01); *G01S 7/4026* (2013.01)
USPC ............................. 342/149; 342/80; 342/174

(58) Field of Classification Search
CPC . G01S 13/4418; G01S 13/44; G01S 13/4463; G01S 7/4026; G01S 13/4454; G01S 13/4472
USPC .................. 342/29, 79, 80, 139, 149–154
See application file for complete search history.

(56) References Cited

U.S. PATENT DOCUMENTS

| | | | |
|---|---|---|---|
| 3,952,304 A * | 4/1976 | Broniwitz et al. | 342/95 |
| 5,808,578 A * | 9/1998 | Barbella et al. | 342/62 |
| 5,945,926 A * | 8/1999 | Ammar et al. | 340/970 |
| 6,441,773 B1 | 8/2002 | Kelly et al. | |
| 6,448,922 B1 | 9/2002 | Kelly | |
| 6,462,697 B1 * | 10/2002 | Klamer et al. | 342/36 |
| 6,650,275 B1 | 11/2003 | Kelly et al. | |
| 6,977,608 B1 | 12/2005 | Anderson et al. | |
| 7,109,912 B1 | 9/2006 | Paramore et al. | |
| 7,109,913 B1 | 9/2006 | Paramore et al. | |
| 7,161,525 B1 | 1/2007 | Finley et al. | |
| 7,242,343 B1 | 7/2007 | Woodell | |
| 7,292,178 B1 | 11/2007 | Woodell et al. | |
| 7,307,576 B1 | 12/2007 | Koenigs | |
| 7,307,577 B1 | 12/2007 | Kronfeld et al. | |
| 7,372,394 B1 | 5/2008 | Woodell et al. | |
| 7,379,014 B1 | 5/2008 | Woodell et al. | |
| 7,417,578 B1 | 8/2008 | Woodell et al. | |
| 7,417,579 B1 | 8/2008 | Woodell | |
| 7,486,220 B1 | 2/2009 | Kronfeld et al. | |
| 7,492,304 B1 | 2/2009 | Woodell et al. | |
| 7,492,305 B1 | 2/2009 | Woodell et al. | |
| 7,515,087 B1 | 4/2009 | Woodell et al. | |
| 7,515,088 B1 | 4/2009 | Woodell et al. | |
| 7,528,765 B1 | 5/2009 | Woodell et al. | |
| 7,541,970 B1 | 6/2009 | Godfrey et al. | |
| 7,541,971 B1 | 6/2009 | Woodell et al. | |
| 7,548,189 B2 * | 6/2009 | Alon et al. | 342/174 |
| 7,557,735 B1 | 7/2009 | Woodell et al. | |
| 7,576,680 B1 | 8/2009 | Woodell | |
| 7,633,428 B1 | 12/2009 | McCusker et al. | |
| 7,633,430 B1 | 12/2009 | Wichgers et al. | |

(Continued)

*Primary Examiner* — John B Sotomayor
*Assistant Examiner* — Marcus Windrich
(74) *Attorney, Agent, or Firm* — Angel N. Gerdzhikov; Donna P. Suchy; Daniel M. Barbieri

(57) ABSTRACT

A multiple beam receiving system provides an angle estimate to targets. The system tracks movements of the targets over time and generates calibration information. The system uses the calibration information to more accurately estimate angle-to-target. The multiple beam receiving system can be part of a monopulse or other radar system, a traffic collision avoidance system, or other electromagnetic sensor.

21 Claims, 4 Drawing Sheets

(56) References Cited

U.S. PATENT DOCUMENTS

| | | |
|---|---|---|
| 7,696,921 B1 | 4/2010 | Finley et al. |
| 7,714,767 B1 | 5/2010 | Kronfeld et al. |
| 7,733,264 B1 | 6/2010 | Woodell et al. |
| 7,859,448 B1 | 12/2010 | Woodell et al. |
| 7,859,449 B1 | 12/2010 | Woodell et al. |
| 7,859,451 B2 * | 12/2010 | Yu et al. .................. 342/149 |
| 7,868,811 B1 | 1/2011 | Woodell et al. |
| 7,872,594 B1 | 1/2011 | Vesel |
| 7,889,117 B1 | 2/2011 | Woodell et al. |
| 7,889,118 B1 | 2/2011 | Finley et al. |
| 7,965,225 B1 | 6/2011 | Dickerson et al. |
| 8,049,660 B2 * | 11/2011 | Mizutani et al. .............. 342/149 |
| 8,072,368 B1 | 12/2011 | Woodell |
| 8,077,078 B1 | 12/2011 | Woodell |
| 8,269,665 B1 * | 9/2012 | Urkowitz et al. ............... 342/80 |
| 2008/0039116 A1 * | 2/2008 | Abraham ................... 455/456.1 |

* cited by examiner

HIGH SPEED ANGLE-TO-TARGET ESTIMATION FOR A MULTIPLE ANTENNA SYSTEM AND METHOD

BACKGROUND OF THE INVENTION

This disclosure relates to receivers including, but not limited to, radar systems and traffic collision and avoidance systems. More particularly, this disclosure relates to sensing an angle-to-target using a multiple antenna system.

Systems can be utilized to sense the presence and location of targets. According to one exemplary application, airborne radar systems can be utilized to detect and locate ground and air targets. The location of the ground and air targets can be displayed to a crew in an aircraft on a two-dimensional map display showing range and bearing to the target or can be used by an on-board or off-board computing system. Targets can be other aircraft, ground structures, vehicles, obstacles, terrain, etc.

Monopulse radar systems generally utilize multiple aperture antennas and include multiple receiver channels. Monopulse radar systems operate in a search mode to identify targets and a track operation to more accurately estimate the angle-to-target. Search mode generally uses Doppler filtering to both increase signal to noise and to allow radar returns to be separated by their Doppler signatures. A detection while searching is generally declared when power in a given radar range, azimuth, elevation, frequency, or location is greater than other returns taken from neighboring range, azimuth, elevation, frequency, or location. Detections may be required to be confirmed by other pulse and process activities, but information related to the target's range, its angular position, and its relative movement either toward or away from the radar can be garnered form the initial detection. These four parameters from the initial detection may not produce an unambiguous understanding of the target's movement or have desired accuracy.

The angle-to-target parameter can have limited accuracy. The accuracy of the angle-to-target parameter from the initial detection is generally limited to the target being within the beam of the radar signal. Since the beam is not a narrow line but has a response several degrees wide, the angle-to-target parameter only can indicate that the target is within several degrees from the beam center.

Thus, there is a need for a reliable low-cost system for and method of making an angle-to-angle target estimate without using a microwave monopulse comparator. Further, there is a need for a radar or traffic collision avoidance system and method that can more accurately estimate angles-to-targets. Further still, there is a need for a radar system and method capable of calibrating mismatch errors in sum and difference channels to estimate an angle-to-target for targets in the area. Yet further still, there is a need for a radar system for and method of utilizing a search operation to estimate angles to target by adjusting for gain mismatch. Further still, there is a need for a reliable system for and method of compensating for mismatch errors and computing angle-to-target parameters. Yet further still, there is a need for a radar system and/or traffic collision avoidance system (TCAS) that achieves the advantages of high speed angle estimation for multiple targets. Thus, there is a need for a system for and method of producing accurate angle estimates without servoing the antenna to be centered on the received target. Further still, there is a need for a high speed system for and a method of providing accurate angle estimates to multiple targets in a target rich environment. Further still, there is a need for a system for and method of calibrating a lobing or monopulse system so that the antenna does not have to servo to the point to the target.

SUMMARY OF THE INVENTION

An exemplary embodiment relates to an multiple antenna lobe receiving system. The multiple antenna lobe receiving system includes a processor for receiving multiple antenna lobe return data from two or more receive channels and for tracking movement of targets using the return data over time. The movement is used to provide calibration data to correct mismatch errors associated with the multiple antenna lobe return data. An angle-to-target estimate for each target is provided without servoing the antenna to point to the target of interest.

Another exemplary embodiment relates to a method for angle-to-target estimates for targets using an avionic receiver. The method includes receiving multiple antenna lobe signals on respective channels, and tracking the movement of the targets using signals derived from the multiple antenna lobe signals over time. The method also includes providing error data using the movement of targets and expected movement of the targets. The method also includes determining an angle-to-target using the signals derived from the multiple antenna lobe signals and the error data.

Another exemplary embodiment relates to a receiver system. The receiver system includes means for analyzing multiple antenna lobe derived return data to identify targets. The receiver system also includes means for determining a mismatch or error associated with each antenna lobe's response associated with the multiple antenna lobe derived return data. An angle-to-target estimate for the targets is provided using the mismatch error and the multiple antenna lobe derived return data.

BRIEF DESCRIPTION OF THE DRAWINGS

These and other features, aspects, and advantages of the present disclosure will become apparent from the following description, appended claims, and the accompanying exemplary embodiments shown in the drawings, which are briefly described below, wherein like numerals denote like elements.

DETAILED DESCRIPTION OF THE PREFERRED EMBODIMENTS

Figure 1:
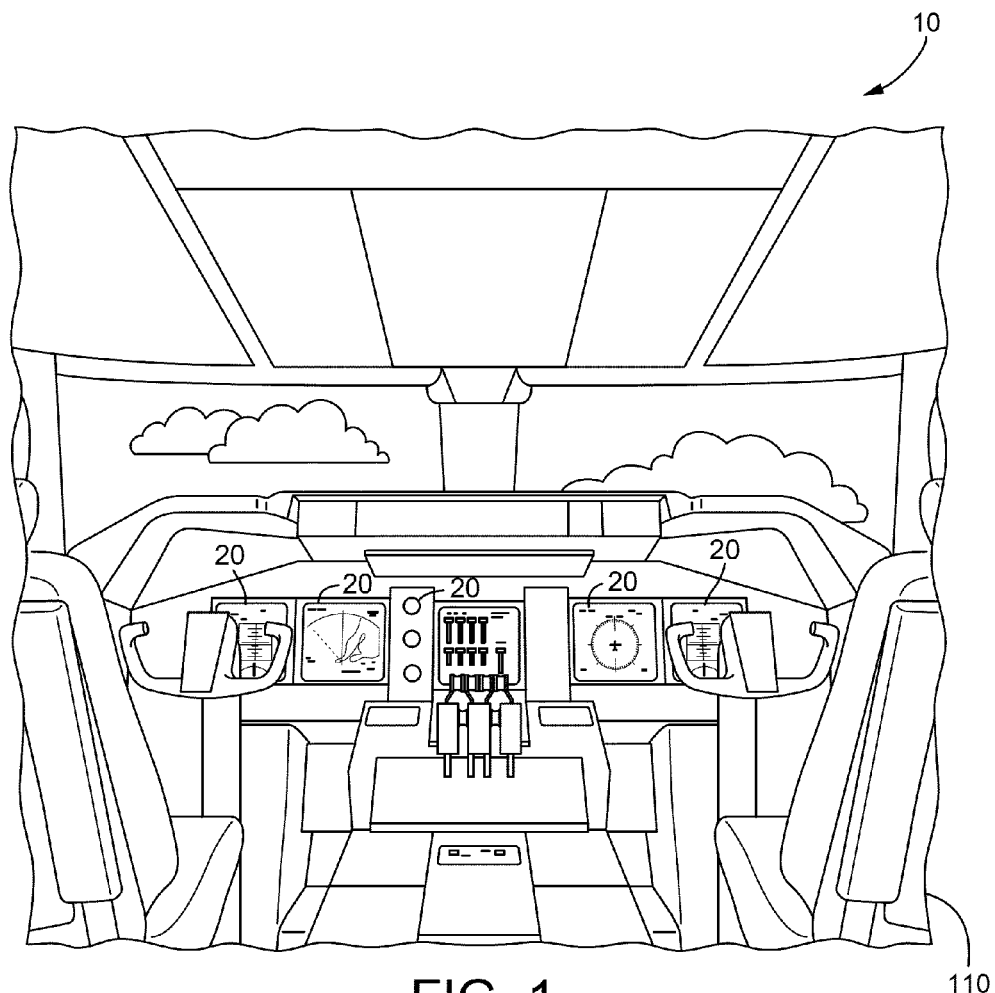
FIG. 1 is a schematic perspective view illustration of an aircraft control center or cockpit, according to an exemplary embodiment.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring to FIG. 1, an illustration of an aircraft control center or cockpit 10 for an aircraft 110 is shown, according to one exemplary embodiment. Aircraft control center 10 includes flight displays 20 which are used to increase visual range and to enhance decision-making abilities. In an exemplary embodiment, flight displays 20 may provide graphical and textual information from a traffic collision avoidance system (TCAS), a flight management computer, a flight management system, navigation system, a terrain awareness system (TAWS) or other device that uses target information. Display 20 may include a head-up display system.

In a preferred embodiment, aircraft control center 10 can provide indications of targets, such as, terrain targets or traffic, on displays 20. Alternatively, target locations can be routed to other computing systems. The computing systems can be off-board and on-board systems. For example, if aircraft 110 is an unmanned aircraft, target locations can be used for navigation computing systems and other maneuvering systems. The target information can also be used by targeting control centers or weapons systems in certain applications.

Aircraft control center 10 can utilize at least one receiver associated with radar or TCAS systems to identify targets and locate targets using angle-to-target estimations in a preferred embodiment. Preferably, target location can be determined without requiring antenna servoing operations. Advantageously, a separate track operation with the separate antenna pointing constraints is not required because overlapping beams in search mode are used. The different search beam positions are preferably used for sequential lobing to generate both detailed angular estimates and execute search at the same time. According to one embodiment, detections happen in multiple overlapping beams and the returns between those multiple beams are used to estimate the targets' angular positions. The antenna pointing angles used are preferably optimized for angular estimation for a given target.

Figure 2:
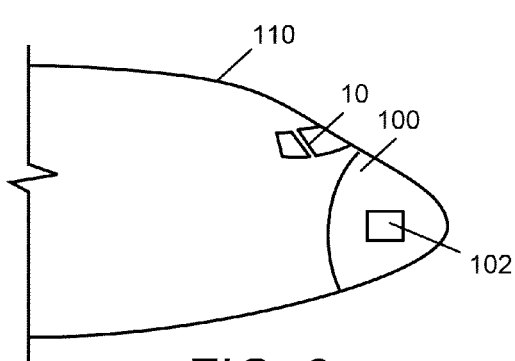
FIG. 2 is a schematic side view illustration of a front of an aircraft with an aircraft control center and nose, according to an exemplary embodiment.

In FIG. 2, the front of aircraft 110 is shown with aircraft control center 10 and nose 100, according to an exemplary embodiment. A receiving system 102, such as a radar system or TCAS, is generally located inside nose 100 of the aircraft or inside a cockpit of the aircraft. According to other exemplary embodiments, system 102 may be located on the top of the aircraft or on the tail of the aircraft. System 102 may include or be coupled to an antenna system or antenna 108.

Figure 3:
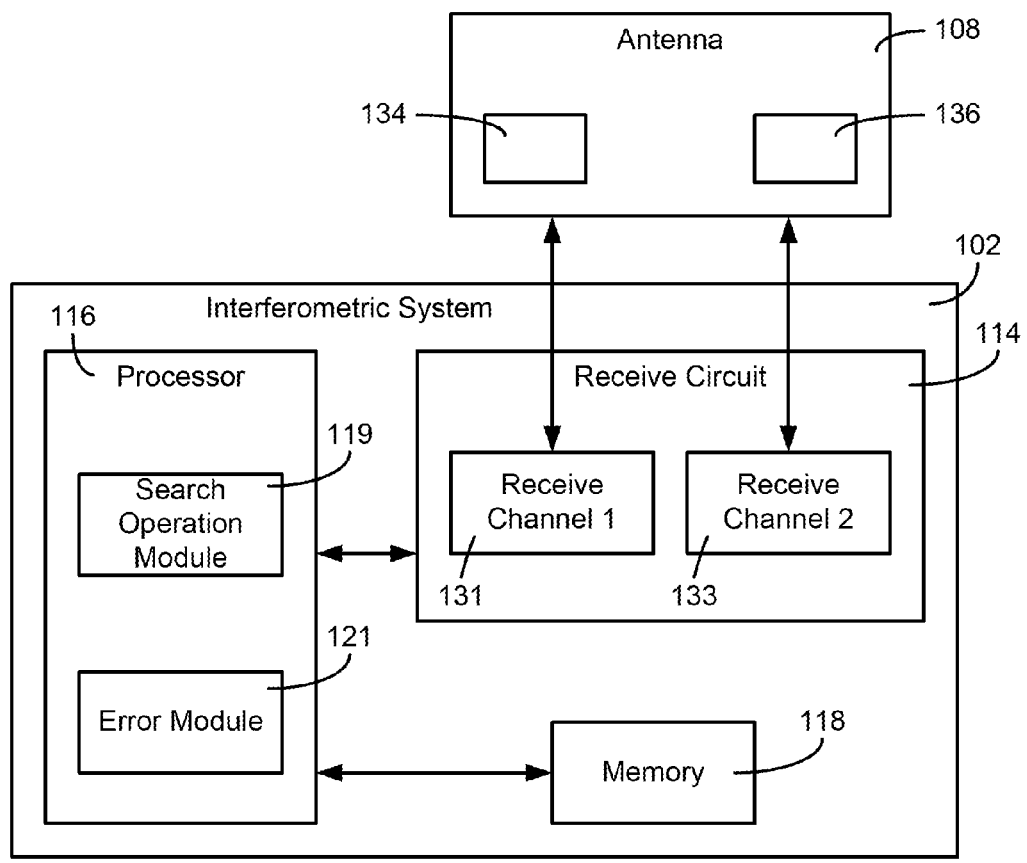
FIG. 3 is a block diagram of an aircraft receiving system, according to an exemplary embodiment.

In FIG. 3, receiving system 102 is shown in greater detail, according to an exemplary embodiment. In one preferred embodiment, receiving system 102 is a monopulse radar system. The monopulse radar system is an amplitude monopulse system or a phase monopulse system.

System 102 may be coupled to antenna 108. Antenna 108 may receive radar returns from a target, such as terrain, traffic, etc. The presence and location of detected targets can be communicated to display 20 for display to the flight crew. System 102 can be part of a TCAS, a ground mapping system, a TAWS, etc.

In a preferred embodiment, system 102 includes a receive circuit 114, a memory 118, and electronics or a processor 116. Receive circuit 114 can be a transmit/receive circuit. In one embodiment, system 102 provides radar signals and receives radar returns in the X-band. Generally, receiver channels 131 and 133 can be mismatched due to variations between components. Generally, mismatch is often due to temperature variations. Receive circuit 114 is coupled to antenna 108 and converts microwave (such as X-band radar returns or signals) received at antenna 108 to base band signals or data for processing by processor 116. In one embodiment, receiver circuit 114 includes frequency conversion circuitry, analog-to-digital conversion circuitry, filters, demodulation circuits, etc.

Receive circuit 114 preferably includes at least two receive channels, such as receive channel 131 and receive channel 133. Receive channel 131 can be a sum receive channel and receive channel 133 can be a difference receive channel associated with a monopulse radar system in one embodiment. In one embodiment, the monopulse radar system can utilize multiple apertures 134 and 136 of antenna 108 to provide sum data on channel 131 and difference data on channel 133 according to a number of techniques. The sum data and difference data is processed by processor 116. In one embodiment, the ratio of the sum and difference data is used to estimate the angle-to-target.

According to one embodiment, antenna 108 includes multiple apertures such as apertures 134 and 136. Apertures 134 and 136 can be offset from a center of antenna 108. The entire aperture of antenna 108 can be used.

In one embodiment, receiving system 102 processes returns to estimate angles-to-target using the sum and difference data. System 102 processes the sum and difference data to track movement of targets over time. The movement is used to provide calibration data to correct errors associated with sum and difference signals. In one embodiment, the errors are phase and amplitude mismatch errors associated with channels 131 and 133.

In one preferred embodiment, processor 116 executes search operation module 19 to determine positions of each target identified. Search operation module 119 can locate targets using an angle-to-target estimate. Module 119 can be a monopulse search algorithm using sum and difference data to locate targets.

Referring generally to system 102 and module 119, a search mode generally requires a search volume to be defined, and that the radar illuminate the entire search volume. Often, a rastering operation is used to sweep the antenna across this field of interest. Beam positions used during the rastering operation are generally optimized to minimize the chance of missing a target in view and hence the antenna beams used generally overlap. A target in the detection field of view should generally fall within a radar beam if the rastering operation has been correctly executed.

Tracking functions can be added to the radar search mode to either resolve ambiguities or to improve accuracy. Tracking functions can use antenna lobing function to improve the accuracy of the target's angular position. Both sequential lobing and monopulse have been used to add that accuracy. Sequential lobing uses the sequential responses from repositioned antenna beams to gain angular information. Monopulse operation uses the target response generated from multiple antenna beams or apertures generated at the same time.

Tracking the angular position of the target imposes a different set of beam constraints. While the search mode uses a defined broad "no-leak" coverage volume, detailed tracking with the classic lobing systems requires the antenna to servo to the target position, moving the antenna to align the antenna beam or set of beams to point directly at the target's angular position. This operation of slewing the antenna to point to the target takes time away from the search mode of operation. This requirement can be particularly disadvantageous in a target rich environment.

If instead of producing separate track operation with the separate antenna pointing constraints, the beams are forced to overlap in search mode such that the different search beam positions can be used for sequential lobing, both of detailed angular estimates and an executed search may be conducted at the same time. Detections may happen in multiple overlapping beams and the returns between those multiple beams used to estimate the targets angular positions. The antenna pointing angles may not be optimized for angular estimation for a given target.

In one exemplary embodiment, each target T1, T2, T3 . . . , Tn can be tracked over time. The position of each target PT1, PT2, PT3, . . . PTn, can be tracked over time using module 119. The positions PT1, PT2, PT3, . . . PTn can be stored in memory 118 at specific time intervals for determining movement. For example, position information can be stored by processor 116 as follows:

$PT1_1, PT1_2, PT1_3, PT1_4, \ldots, PT1_t,$
$PT2_1, PT2_2, PT2_3, PT2_4, \ldots, PT2_t,$
$PT3_1, PT3_2, PT3_3, PT3_4, \ldots, PT3_t,$
$PTn_1, PTn_2, PTn_3, PTn_4, \ldots, PTn_t;$ where $PTn_t$ is the target position of target Tn of time. The reference n is an integer.

The position or angle-to-target is compared to an expected movement (e.g., a linear movement) to determine difference errors for each target Tn. In one embodiment, processor 116 executes error module 121 to compare target movement to linear movement to determine differences and hence mismatch errors. The differences are applied to a least squares fit, an averaging algorithm, Kalman filter, alpha-beta algorithm, etc. to determine error or calibration data. The error is representative of the mismatch error associated with channels 131 and 133.

Generally, errors can be the result of bias turns, bias lefts, bias rights and gain errors. The error data can be calculated to determine a best gain and bias offset value. Using multiple targets and multiple time periods, many observations of bias turns and offset turns can be obtained.

According to one preferred embodiment, antenna 108 and receive circuit 114 do not require a microwave monopulse comparator for converting the phase information into a sum and difference signals on the back end. By using channels 131 and 133 without microwave comparators, integration can be performed on returns. In one embodiment, better integration gains are achievable and returns can be held and integrated separately. In one embodiment, the lack of the microwave monopulse comparator advantageously allows system 102 to utilize deconvolution functions, terrain following functions, and other processing techniques which are not available when a microwave monopulse comparator is utilized.

Although shown as two different modules or units in processor 116, search operation module 119 and error module 121 can be integrated as a single unit or be separate from processor 116 or system 102. Modules 119 and 121 can be a combination of hardware and software. Modules 119 and 121 can be routines of electronics executable instructions stored on a non-transitory medium for execution on a radar or TCAS hardware platform.

Processor 116 can receive a signal from a temperature sensor or other temperature sensing device. Processor 116 can store temperature readings in memory 118. Temperature readings can be associated with mismatch errors, thereby providing a database of temperature to mismatch errors. Temperature changes can occur as the aircraft travels through different environments and different altitudes. The database can be utilized for design analysis and for providing a predictive mismatch error in response to temperature.

Error module 121 preferably receives data associated with a sum and difference returns on channels 131 and 133 and tracks movements of targets which can be monitored to obtain angle measurements associated with the targets. Generally, targets are not moving violently (e.g., not jinxing) and are moving moderately linearly. However, the returns may indicate that the movement is occurring in a curved fashion or at curved angles over time. Accordingly, error can be determined by comparing the moderate straight lines to the curved angle over time to determine a calibration data. The calibration data can be determined according to an averaging algorithm or a least square fit algorithm. In one embodiment, a Kalman filter can be utilized to predict the error data.

Better integration gains are available and high accuracy recompilation process can be utilized due to the use of error module 121 in system 102. Generally, the errors associated with multiple targets can be treated as an assemblage and averaged to represent total errors on the system in either gain or in phase. Error module 121 generally uses targets that are not moving linearly towards antenna 108, but rather targets that are moving across the field of view of antenna 108. Generally, turns, biases can be determined as the movement occurs across antenna 108. Targets that are moving directly towards antenna 108 can be eliminated from the analysis of error module 121.

Although a single error generally does not provide significant accuracy, collection of errors at multiple targets allows a distilled set of average errors to be determined. Preferably, system 102 can achieve accuracy of 10-to-1 to 16-to-1 compared to the beam depending upon signal to noise and other factors. Generally, search operation module 119 and error module 121 can utilize any type of radar sweep, horizontal, vertical, diagonal and combinations thereof for searching environment for targets and compensating for errors.

Figure 4:
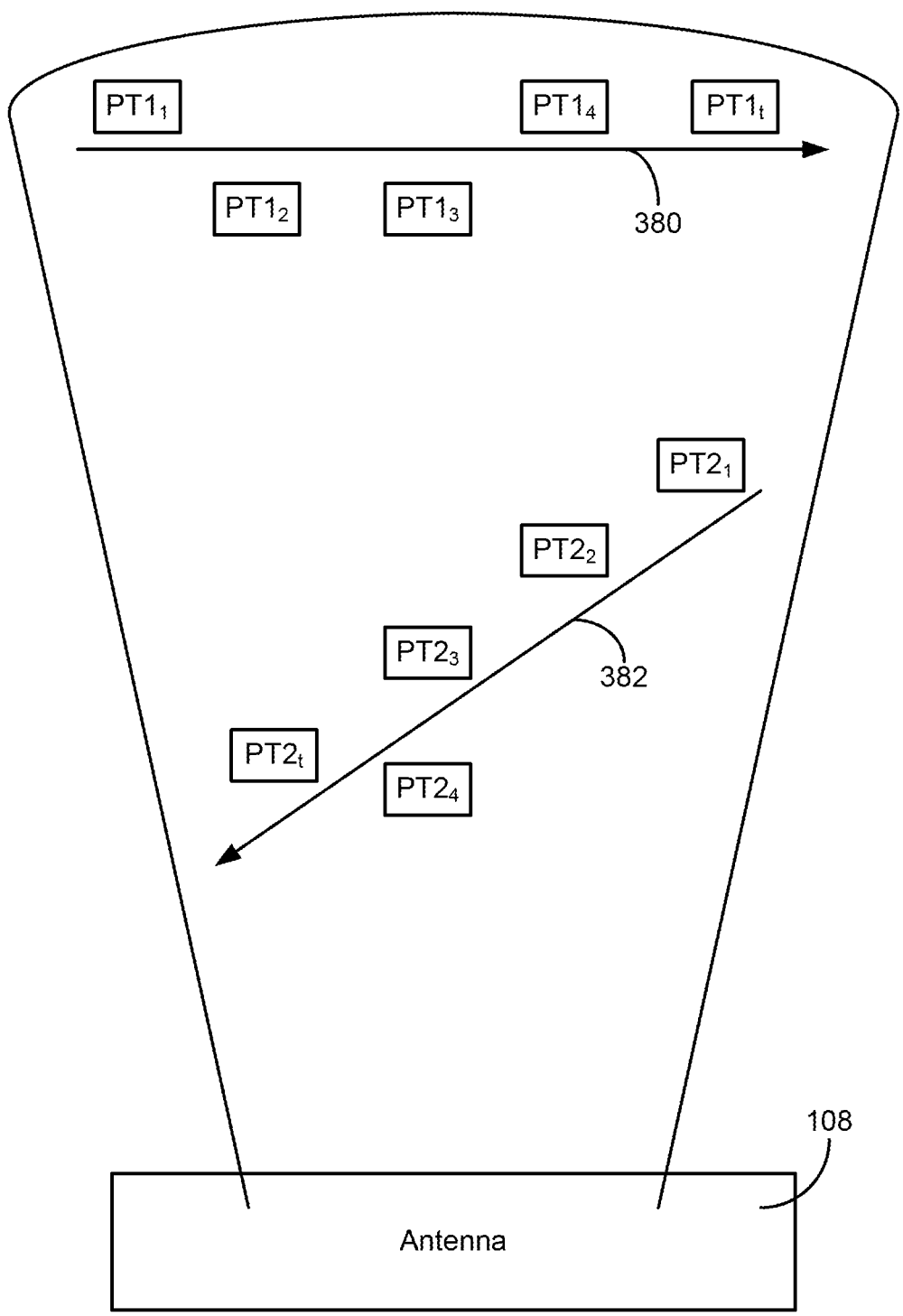
FIG. 4 is a schematic illustration of targets in the field of view of the system illustrated in FIG. 3 in accordance with an exemplary embodiment.

With reference to FIG. 4, an exemplary field of view of antenna 108 can include targets T1 and T2. Positions PT1 and PT2 of targets T1 and T2, respectively, are shown at times 1, 2, 3, 4 and t. Positions PT1 and PT2 can be represented and electronically stored as angle-to-target values, as positions in a coordinate system, as a relative position to aircraft 110, or as other location information.

As shown in FIG. 4, the positions of target T1 can take a somewhat non-linear path as opposed to a more linear path 380. Similarly, the positions of target PT2 take a non-linear path as opposed to a more linear path 382. By comparing the movement of positions PT1 over time with path 380, error data can be generated. Similarly, the movement of positions PT2 over time can be compared to path 382 to generate error data. For example, the target position PT1 generally should not be jinxing or moving in a non-normal fashion. Non-normal movements can be due to errors associated with mismatching in channels 131 and 133. Accordingly, developing an estimate of the error can be used to more accurately locate targets such T1 and T2. Generally, one movement of a target is not sufficient to provide significant calibration data and calibration data should be collected over multiple targets and multiple times to determine an appropriate mismatch error.

Although paths 380 and 382 are shown as straight lines, other linear paths can be utilized. Paths 380 and 382 are exemplary and not shown in a limiting fashion.

Figure 5:
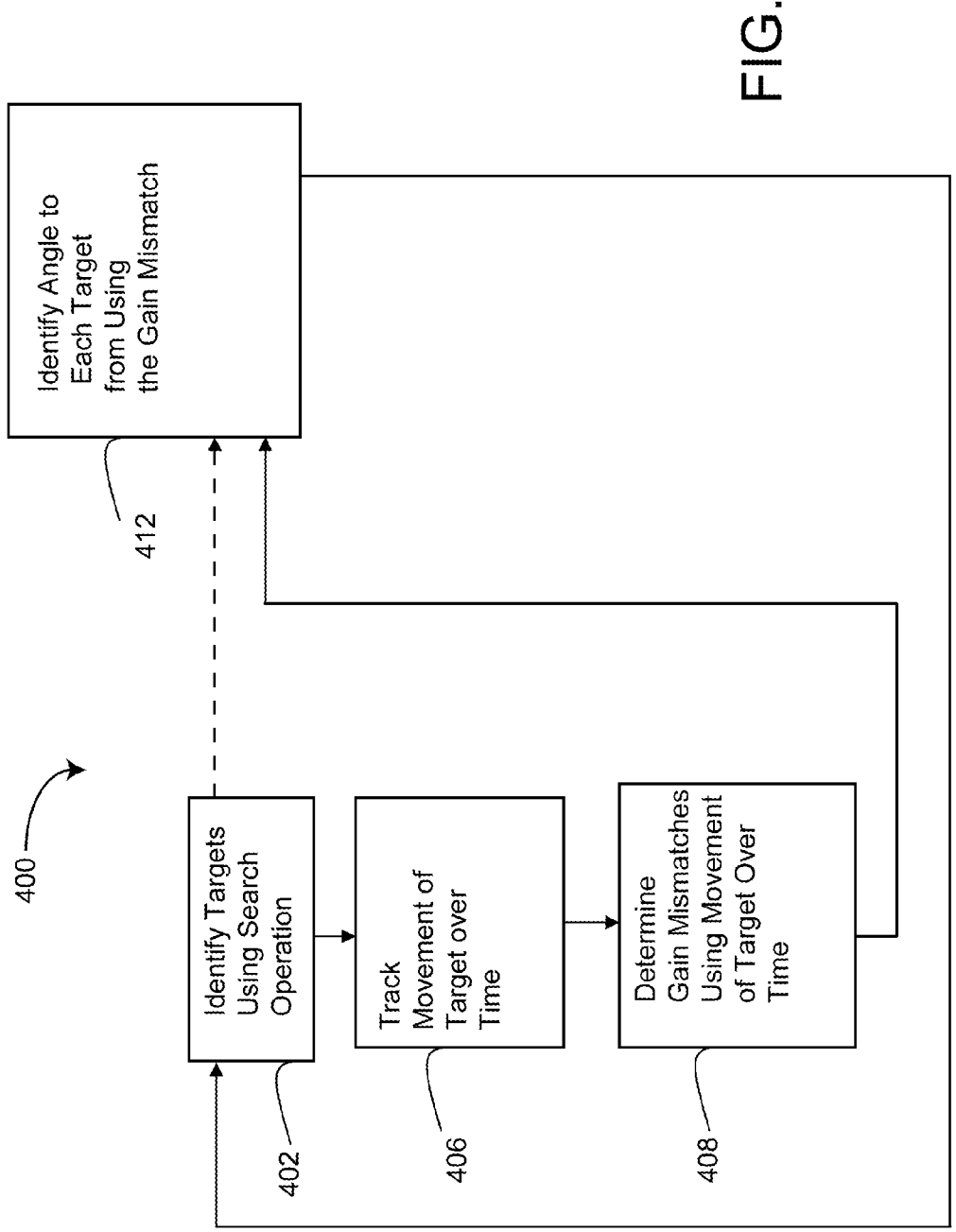
FIG. 5 is a process flow diagram of a method for making angle-to-target estimates, according to an exemplary embodiment.

With reference to FIGS. 3 and 5, system 10 utilizes search operation module 19 to perform a search operation. In one embodiment, the search operation can provide a radar scan via antenna 108 and receive radar returns via channels 131 and 133. Preferably, the radar returns are a sum return and a difference return. The sum data associated with the sum return and difference data associated with difference return are provided to processor 116 for analysis. In other embodiments, antenna 108 can be used to receive chirps from a system such as a TCAS-type system.

In a step 406, processor 116 uses error module 121 to track movements of targets over time. Preferably, multiple targets are tracked over time. The movements of targets are compared to expected linear movement.

In a step 408, gain mismatches are determined by determining errors between the linear movement and the actual tracked movement at a step 406. At a step 412, the angle-to-target is determined using the gain mismatch. The gain mismatch can be a phase or amplitude gain mismatch. Once the mismatch is known, estimates of angle-to-target can be calculated without tracking movements in one embodiment (step 406 can be followed by step 412). However, continued calculation of mismatch errors is desirable because mismatch errors can change over time.

While the detailed drawings, specific examples, detailed algorithms, and particular configurations given describe preferred and exemplary embodiments, they serve the purpose of illustration only. The inventions disclosed are not limited to the specific forms shown. For example, the methods may be performed in any of a variety of sequence of steps, in whole or in part, in various equipment or according to any of a variety of mathematical formulas without departing from the invention. The hardware and software configurations shown and described may differ depending on the chosen performance characteristics and physical characteristics of the radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. A multiple antenna lobe receiving system, comprising:
a processor; and
a memory coupled to the processor and containing program instructions that, when executed by the processor, cause the multiple antenna lobe receiving system to
receive multiple antenna lobe return data from two or more receive channels; and
track movement of targets using the multiple antenna lobe return data over time;
wherein the movement is used to provide system calibration data to correct mismatch errors associated with the multiple antenna lobe return data, and wherein an angle-to-target estimate for each target of the targets is provided without servoing an antenna to point to each target and wherein target movement as sensed by the multiple antenna lobe receiving system is compared to a linearized target movement model for each target of the targets to estimate the system calibration data.

2. The multiple antenna lobe receiving system of claim 1, wherein the multiple antenna lobe receiving system is a radar system.

3. The multiple antenna lobe receiving system of claim 1, wherein the multiple antenna lobe receiving system is a traffic collision avoidance system.

4. The multiple antenna lobe receiving system of claim 1, wherein the system calibration data is at least one of gain, phase, gain slope, phase slope, or a function driven by sensed angle and producing an angular error offset.

5. The multiple antenna lobe receiving system of claim 4, wherein the linearized target movement model is taken from a Kalman filter using an estimate of errors of the multiple antenna lobe receiving system.

6. The multiple antenna lobe receiving system of claim 5, wherein the comparison is performed iteratively producing new estimates of target position and system error terms.

7. The multiple antenna lobe receiving system of claim 1, wherein the multiple antenna lobe receiving system is a monopulse system without a microwave monopulse comparator.

8. The multiple antenna lobe receiving system of claim 1, wherein the system calibration data is generated from calibration averaged from multiple detections of multiple targets.

9. A method of providing angle-to-target estimates for targets using an avionics receiver, the method comprising:
receiving multiple antenna lobe responses on respective channels;
tracking movement of the targets using signals derived from the multiple antenna lobe responses over time;
providing error data using the movement of the targets and expected movement of the targets wherein the error data is related to mismatch errors, wherein the movement of the targets is used to provide calibration data, wherein the movement of the targets as derived from the multiple antenna lobe responses is compared to a linearized target movement for each target of the targets to provide the calibration data; and
determining an angle-to-target from the multiple antenna lobes responses.

10. The method of claim 9, wherein the error data represents a phase mismatch associated with the channels.

11. The method of claim 9, wherein the error data represents an amplitude mismatch from sum and difference channels generated from the multiple antenna lobe signals.

12. The method of claim 11, wherein the multiple antenna lobe returns are TCAS pulses.

13. The method of claim 9, wherein the movement uses a maximum return associated with the multiple antenna lobe signals on the channels.

14. The method of claim 9, wherein the error data is determined using least square fit in a Kalman filter.

15. A receiver system, comprising:
means for analyzing multiple antenna lobe derived return data to identify targets; and
means for determining a mismatch error associated with each antenna lobe's response associated with the multiple antenna lobe derived return data wherein an angle-to-target estimate for each target is provided using the mismatch error and the multiple antenna lobe return data, and wherein target movement as sensed by the receiver system is compared to a linearized target movement model for each target to estimate system calibration data.

16. The system of claim 15, wherein the receiver system is a phase monopulse system.

17. The system of claim 15, wherein the receiver system is an amplitude comparison monopulse system.

18. The system of claim 15, wherein the multiple antenna lobe derived return data are received from sum and difference receive channels,
wherein the sum and difference receive channels do not include microwave monopulse comparator.

19. The system of claim 15, further compromising:
means for sensing temperature, and
means for storing the temperature with respect to the mismatch error.

20. The system of claim 15, wherein the receiver system is part of a TCAS.

21. The system of claim 15, wherein means for determining includes a Kalman filter.

* * * * *